Figure 1:
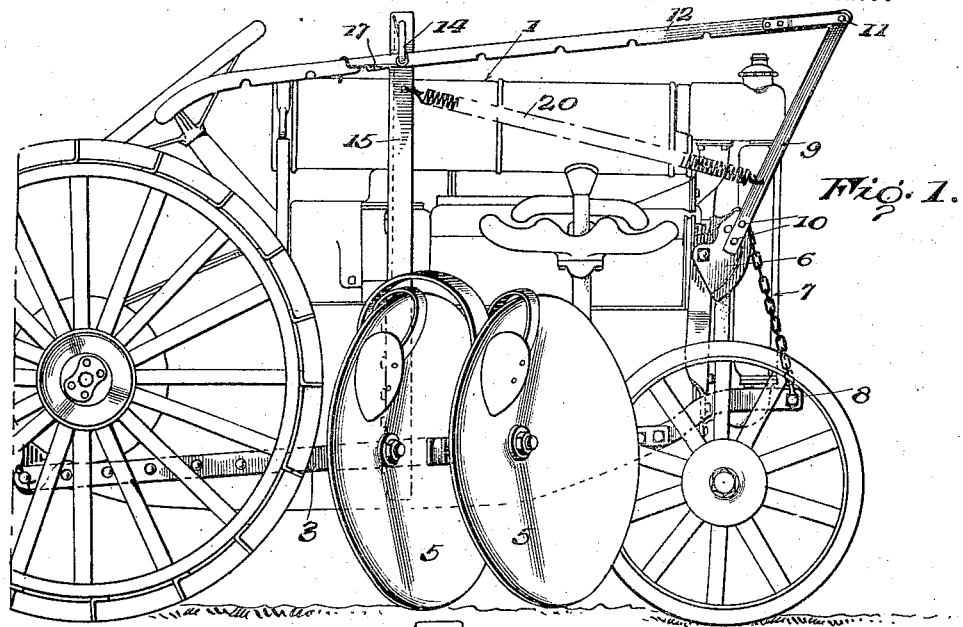

March 15, 1927.  
L. C. HESTER  
PLOW  
Filed June 24, 1926  
1,620,969  
2 Sheets-Sheet 1

INVENTOR
L. C. Hester
BY
ATTORNEYS

March 15, 1927.
L. C. HESTER
PLOW
Filed June 24, 1926   2 Sheets-Sheet 2
1,620,969
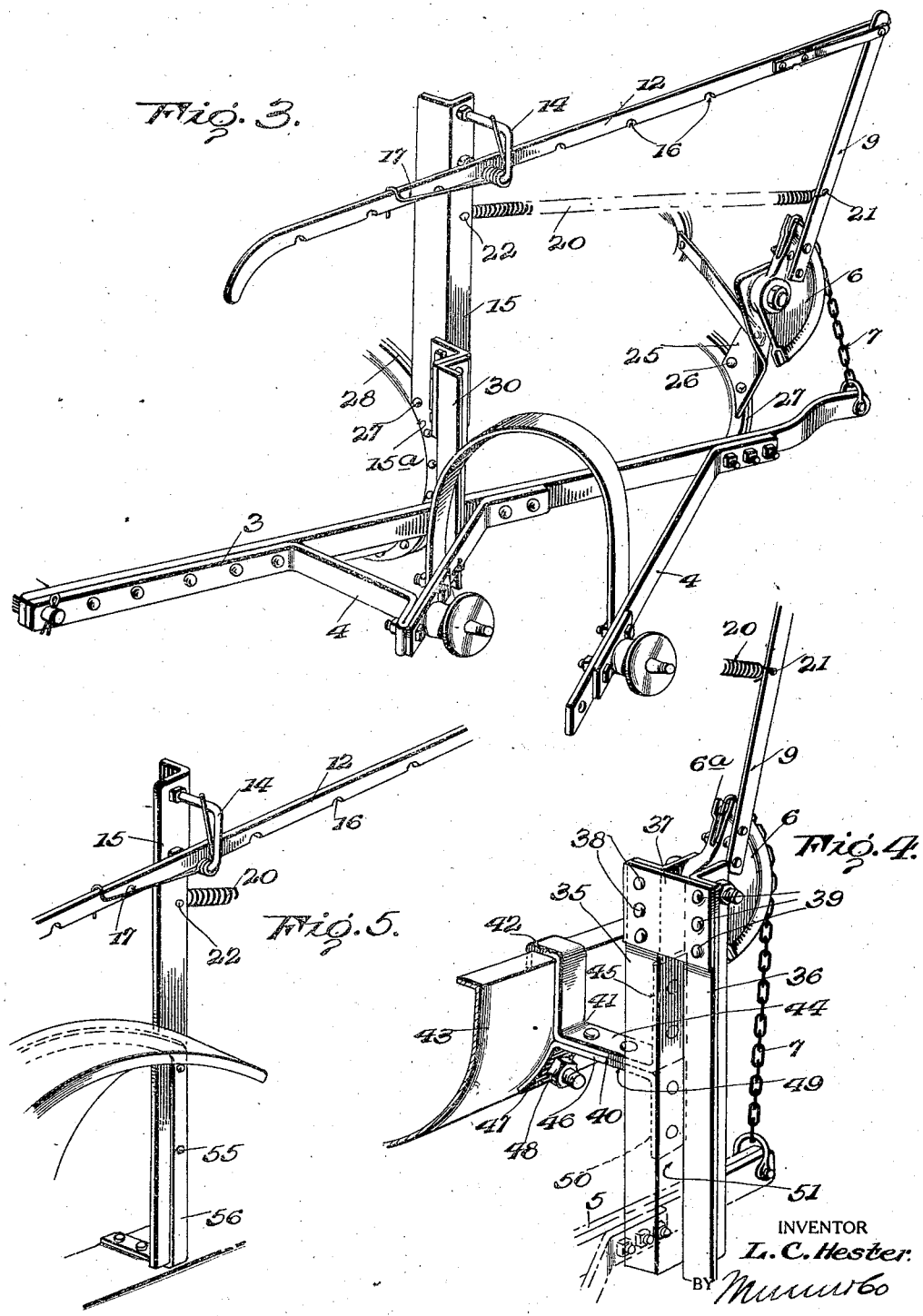

Patented Mar. 15, 1927.

1,620,969

UNITED STATES PATENT OFFICE.

LEVI C. HESTER, OF JACKSONVILLE, FLORIDA.

PLOW.

Application filed June 24, 1926. Serial No. 118,291.

This invention relates in general to an improvement in plows and more particularly relates to an improvement in lifts especially designed and adapted for use with plows employed on tractors.

The object of the present invention is to provide a lift mechanism which does not interfere with the cutting action of the plow when it is desired to have the plow cut to its maximum depth but which may be readily adjusted to vary the depth of cut of the plow or to lift the plow up above the ground.

A further object is to provide a lifting mechanism wherein the full weight of the plows and associated structure operates to maintain the plows in the ground during the lifting operation and yet this weight of the plows is counterbalanced when the lift is brought into action to elevate the plows.

A further object is to provide a lift which is independent of the running gear of the plow, thereby insuring uniform depth of cut irrespective of how the running gear may be vibrated or moved up and down and yet along with this advantage the lift is of such a character as to be quick-acting and easy to manipulate.

A still further object resides in the provision of a plow wherein the plow assembly is free to move up over rocks or other obstructions that plows are not designed and adapted to cut through.

Accordingly the present invention resides in the provision of a lifting mechanism on the body or housing of a tractor which controls a disc plow assembly mounted on a swingable push bar by means of a flexible though positive connection such as a chain or the like. Preferably the chain employed between the lifting mechanism and the plows has one end connected to the push bars and has its other end connected to a sector pivoted to the brackets secured to the housing of the tractor and controlled by a lever and operating bar. Means is provided for locking the operating bar in any adjustment, and in conjunction with the lever means is provided for counterbalancing the weight of the plows. This counter-balancing means is only effective when the operating bar is released from its locking mechanism and this has the advantage of leaving the full weight of the plows operative to maintain the plows in the ground during the plowing operation.

As the lift is mounted entirely on the housing and tractor above the running gear thereof, the vibrations of the running gear are not transmitted to the plows and consequently the furrow is even and uniform.

Figure 2:
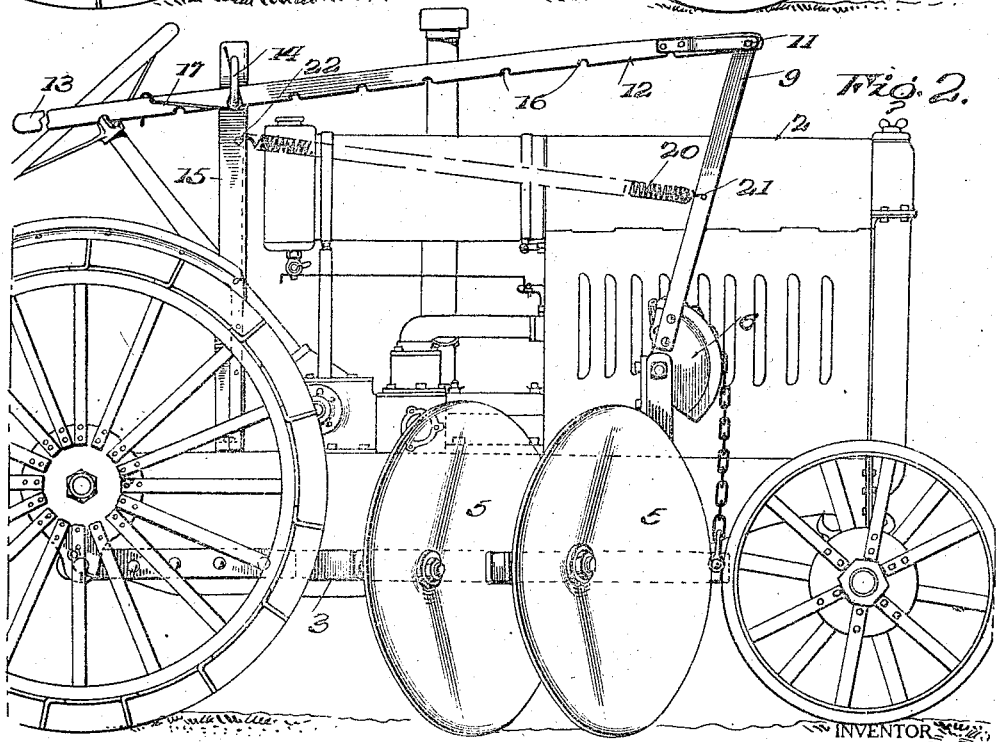

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing a lift embodying the present invention mounted on one type of tractor, Figure 2 is a similar view showing the invention mounted on another type of tractor, Figure 3 is a perspective view showing a lifting mechanism employed with the tractor shown in Figure 1, Figure 4 is a fragmentary perspective view showing how the lift is mounted on the tractor shown in Fig. 2, and Figure 5 is a detail perspective view showing the mounting of the standard which carries the guide for the rocking bar in the application of the invention shown in Fig. 2.

Referring to the drawings it will be seen that in both applications of the invention the essential features of the lifting mechanism are the same. In the different views details of the two applications of the invention will be pointed out. In Figs. 1 and 3 one type of tractor is shown and is designated at 1. The type of tractor shown in Fig. 2 is somewhat different, as indicated at 2.

In both applications of the invention a push bar 3 is provided and has its rear end pivotally and positively connected to a suitable part of the tractor. On the push bars 3 plow beams 4 are provided and carry disc plows 5. The lifting mechanism which constitutes the present invention includes a sector 6 pivotally mounted on the body of the tractor or on the tractor housing by suitable brackets and connected to one end of a chain 7, the chain 7 being also connected to the forward end of the push bar 3, as indicated at 8. A lever arm 9 is fixed, as at 10, to the sector and is also pivotally connected, as at 11, to an operating bar 12. The operating bar 12 has a handle portion 13 and is slidable through a U-shaped guide 14 carried on an angle bar standard 15. The lower edge of the bar 12 has a series of notches 16 designed to selectively engage the lower portion of the guide 16. A spring 17 urges the bar 12 down against the lower portion of the guide 14 to insure interlocking engagement between the notches 16 and the guide. When any one of the notches 16 engages the lower portion of the guide 14 the lever arm 9 and consequently the sector 6 is locked in position and is firmly and positively held against movement in either direction. The operating bar 12 may be readily released by swinging the same upwardly against the tension of the spring 17 after which it may be moved either backward or forward.

For the purpose of counterbalancing the weight of the plows during the lifting operation and yet leaving the full weight of the plows effective to maintain the plows in the ground a retractile coil spring 20 is provided and has one end connected, as at 21, to the lever arm 9 and has its other end connected, as at 22, to the standard 15. The periphery of the sector 6 is grooved to receive the chain, as clearly shown at 6a and the advantage of using this sector is that it provides a quick-acting lift which has a relatively great throw or operative movement in all phases of the lifting operation. The chain 7 provides a flexible yet positive connection which may be used to regulate the depth of cut and yet permit upward movement of the plow assembly should a boulder or other obstruction too heavy or hard for the plows to cut be encountered. While the spring 20 does not act during the plowing operation as soon as the lift is brought into operation this spring 20 at once becomes operative to counterbalance the weight of the plows and facilitate the lifting operation.

As clearly shown in Fig. 3 the sector 6 in the embodiment of the invention shown in Figs. 1 and 3 is pivotally mounted on a bracket 25 bolted, as at 26, to flanges 27 which are ordinarily provided on the tractor housing. The standard 15 has one of its flanges cut away, as at 15a, to adapt it to engage a portion of the tractor housing and to be bolted as at 27, to flanges 28 of the tractor housing. This standard 15 in the embodiment of the invention shown in Fig. 3 carries the guide 30 employed for constraining the push bar 3 to vertical movement.

In the form of the invention shown in Figs. 2, 4 and 5 the sector 6 is pivotally mounted between the upper ends of angle bars 35 and 36, the angle bars 35 and 36 being maintained in spaced parallel relation by means of a plate 37 riveted, as at 38 and 39, to the angle bars 35 and 36, respectively. The angle bar 35 has one of its flanges bolted or riveted to a bracket, designated generally at 40, the bracket 40 including a member 41 having a grip 42 embracing the housing 43 of the tractor. The member 41 also has an outwardly extending portion 44 terminating in a vertical attaching portion 45. The bracket 40 is completed by a brace member 46 having a curved portion 47 secured by a bolt and nut 48 to the housing 43 and also having an outwardly extending portion 49 terminating in an attaching portion 50 riveted to the bar 5. The angle bars 35 and 36 not only provide a mounting for the sector 6 but also define a guide slot 51 to receive the forward end of the push bar 3 and constrain the plow assembly to vertical swinging movement. The angle bar 15 in the form of the invention shown in Figs. 2, 4 and 5 may be conveniently secured by rivets or bolts and nuts 55 to the bracket 56 of the mud guard or fender, as shown to advantage in Fig. 5.

I claim:—

1. A plow for use on tractors comprising a push bar having its rearward end connected to the body of the tractor, a plow assembly mounted on the said push bar, a lift support secured to the body of the tractor, a sector pivoted to said support, means for rocking said sector, and a chain between the sector and the push bar.

2. A plow for use on tractors and in accordance with claim 1 and wherein the means for rocking the sector comprises a lever arm connected to the sector, an operating bar pivoted to said lever arm, a guide fixed on the tractor through which the operating bar slides, said operating bar and said guide having interengaging parts for holding the part in adjusted position.

3. A plow for use on tractors comprising a push bar having its rearward end connected to the body of the tractor, a plow assembly mounted on said push bar, a lift support secured to the body of the tractor, a sector pivoted to said support, a lever arm pivoted to said sector, an operating bar pivoted to said lever arm, a guide fixed on the tractor and through which the operating bar slides, said operating bar and said guide having interengaging parts for holding the bar in adjusted position, a chain between the sector and the push bar, and a spring connected to the tractor and lever arm to counterbalance the weight of the plows during the lifting operation.

LEVI C. HESTER.